United States Patent [19]

Casey et al.

[11] 4,049,854

[45] Sept. 20, 1977

[54] SYSTEM FOR INFLATION AND SEALING OF AIR CUSHIONS

[75] Inventors: James H. Casey, Roseville; Curtis Lee Larson, St. Paul; Robert Campbell Brown, Falcon Heights, all of Minn.

[73] Assignee: Minnesota Mining and Manufacturing Company, St. Paul, Minn.

[21] Appl. No.: 663,739

[22] Filed: Mar. 4, 1976

Related U.S. Application Data

[63] Continuation of Ser. No. 471,580, May 20, 1974, abandoned.

[51] Int. Cl.² .......................................... B65B 31/04
[52] U.S. Cl. ..................................... 428/72; 156/147; 156/285; 156/290; 428/178; 428/138
[58] Field of Search ............. 53/112 R, 112 A; 5/337, 5/341; 156/145, 147, 285, 290; 428/12, 72, 116, 137, 138, 166, 178

[56] References Cited

U.S. PATENT DOCUMENTS

| | | | |
|---|---|---|---|
| 2,522,079 | 9/1950 | Winstead | 156/145 |
| 2,575,764 | 11/1951 | Morner | 428/72 |
| 3,008,214 | 11/1961 | Foster et al. | 428/12 |
| 3,011,930 | 12/1961 | Dworak | 156/145 X |
| 3,115,647 | 12/1963 | Emery | 5/341 |
| 3,303,628 | 2/1967 | Lovas et al. | 53/112 A |
| 3,366,523 | 1/1968 | Weber | 156/145 |
| 3,660,189 | 5/1972 | Troy | 156/145 |
| 3,817,803 | 6/1974 | Horsky | 156/285 X |
| 3,868,285 | 2/1975 | Troy | 156/147 |
| 3,938,298 | 2/1976 | Luhman et al. | 156/147 X |
| 4,005,236 | 1/1977 | Graebe | 428/178 X |

FOREIGN PATENT DOCUMENTS

| | | | |
|---|---|---|---|
| 936,088 | 9/1963 | United Kingdom | 428/178 |
| 965,809 | 8/1964 | United Kingdom | 428/178 |

Primary Examiner—George F. Lesmes
Assistant Examiner—Henry F. Epstein
Attorney, Agent, or Firm—Cruzan Alexander; Donald M. Sell; William L. Huebsch

[57] ABSTRACT

A system of providing convenient filling and sealing of air cushions at the site of their intended use, such as at a packaging line. A concatenation of inflatable cushions is prepared with each cushion comprising two thin films of a thermoplastic, at least one of which films has a generally central opening. The films are fused together in discrete areas to define a plurality of inflatable chambers between the films disposed around the opening, with each of the chambers having an inlet passageway communicating with the opening. The cushions are shipped uninflated to the site where they are to be used, and are then inflated and sealed on a device which includes a nozzle for simultaneously directing air through the opening of the cushion and the inlet passageways to inflate the chambers, and a means for sealing together the films in a small area around the opening to close the inlet passageways to the chambers.

1 Claim, 13 Drawing Figures

SYSTEM FOR INFLATION AND SEALING OF AIR CUSHIONS

This is a continuation of application Ser. No. 471,580, filed May 20, 1974, now abandoned.

BACKGROUND OF THE INVENTION

1. Field of the Invention

The present invention relates to air cushions of the type comprising chambers filled with air formed between two films of thermoplastic material, and to devices for filling and sealing such air cushions.

2. Description of the Prior Art

U.S. Letters Pat. No. 3,660,189 suggests a system for forming and inflating air cushions in which (1) inflatable air cushions are prepared by fusing together two heat sealable films in discrete areas to define a plurality of chambers between the films with each chamber having an open inlet passageway; (2) the uninflated air cushions are shipped to the site of their intended use (e.g. such as a packaging line in a production facility); and (3) a device is then used to inflate and seal the cushions. This type of system is known to reduce bulk handling problems and the costs of shipping air which would otherwise result if the air cushions were inflated and sealed at a central production facility and were then shipped in an inflated condition to the site of their intended use. The inflatable cushion used in the system of U.S. Pat. No. 3,660,189, however, has large elongate preformed chambers positioned in side-by-side relationship, with the chambers having aligned open ends. The device for inflating the chambers must sequentially position the open ends of the chambers adjacent a fill nozzle and then preform extensive heat sealing operations to seal the inlet passageways to the chambers, and to divide the elongate chambers into smaller chambers of a more desired size. Thus the filling and sealing device requires a complex sealing mechanism, making it less simple and compact than might be desired; and the shapes of the chambers than can be produced are less variable than might be desired.

SUMMARY OF THE INVENTION

The present invention provides a simple and versatile system of the aforementioned type which affords inflating and sealing previously prepared air cushions at the site of their intended use. Inflatable cushions, according to the present invention, can easily be prepared which have individual chambers in any of a large variety of desired sizes and shapes. All of the chambers in the cushions can be simultaneously inflated through a single opening communicating with separate inlet passageways for the chambers. This is done by a device which first directs air from a nozzle through the opening and into the chambers, and then seals the ends of the inlet passageways in a small area around the opening to provide an inflated and sealed air cushion suitable for use in protecting packaged goods.

The cushions according to the present invention each comprise two thin flexible films each having at least one surface formed by a heat sealable thermoplastic material. At least one of the films has an opening. The films ar positioned with their thermoplastic surfaces in face-to-face contact, and are fused together in discrete areas to provide a plurality of inflatable chambers between the films disposed around the opening, and each having a separate inlet passageway communicating with the opening.

The inflatable chambers in the cushions may be in any of several shapes which can be designed to provide a planar, curved or angled cushion after the cushion is inflated. Preferably, the opening through which the cushion is inflated is generally centrally located on the sheet and the inlet passageways and inflatable chambers are evenly disposed around the opening so that all of the chambers will be uniformly inflated as the device applies air through the nozzle.

The cushions may also include chambers which communicate through crossover passageways with the chambers having the inlet passageways to provide a desired configuration for the cushion, and/or to provide shock absorption between the interconnected chambers of the inflated cushion via movement of air through the crossover passageway.

BRIEF DESCRIPTION OF THE DRAWING

The present invention will be further described with reference to the accompanying drawing wherein like numbers refer to like parts in the several views, and wherein.

DESCRIPTION OF THE PREFERRED EMBODIMENTS

Figure 1:
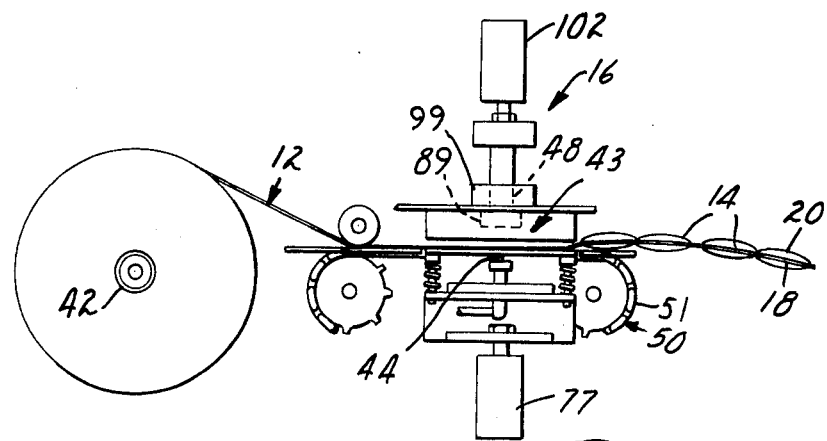
FIG. 1 is a schematic illustration of a system according to the present invention for providing on site completion of air cushions.

Referring now to the drawing, there is schematically illustrated in FIG. 1 a system according to the present invention for providing convenient completion of air filled cushions, such as are used in packaging, at the site of their intended use. The system comprises a strip material 12 which provides a concatenation of inflatable cushions 14 of the type illustrated in FIG. 2, and a device 16 which sequentially inflates and seals the cushions 14, after which the inflated cushions 14 may be separated from the strip material 12 and used as desired.

Figure 2:
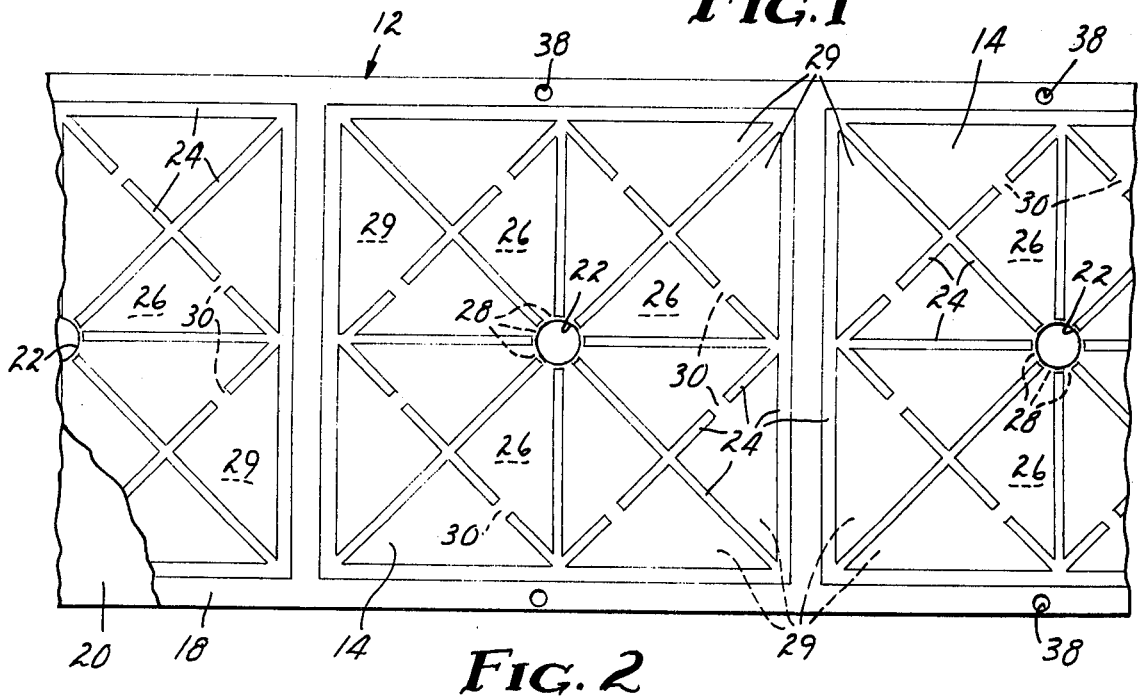
FIG. 2 is a fragmentary plan view of a first embodiment of a strip material used in the system of FIG. 1.
Figure 4:
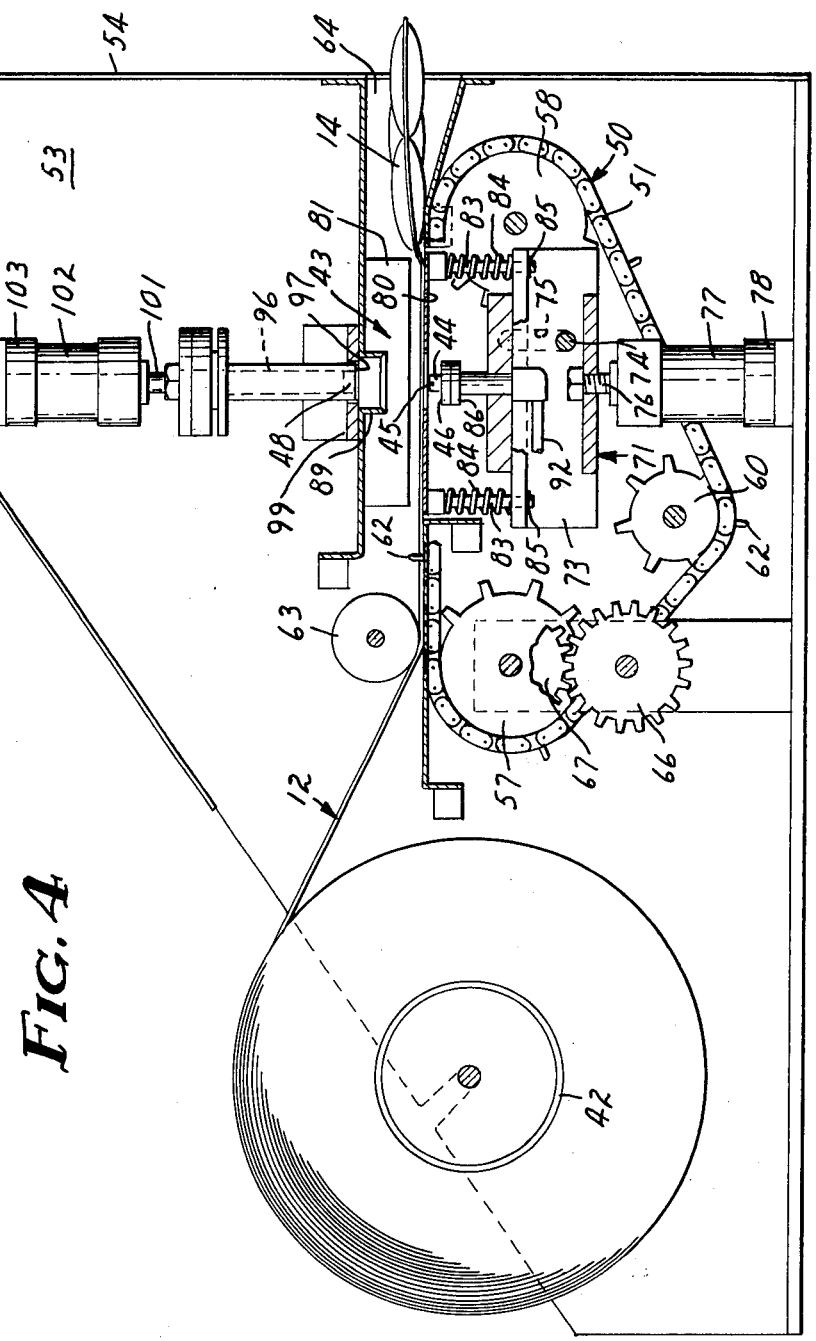
FIG. 4 is an elevational side view, partially in section, of a device included in the system of FIG. 1 for inflating the strip material of FIG. 2.
Figures 5, 6:
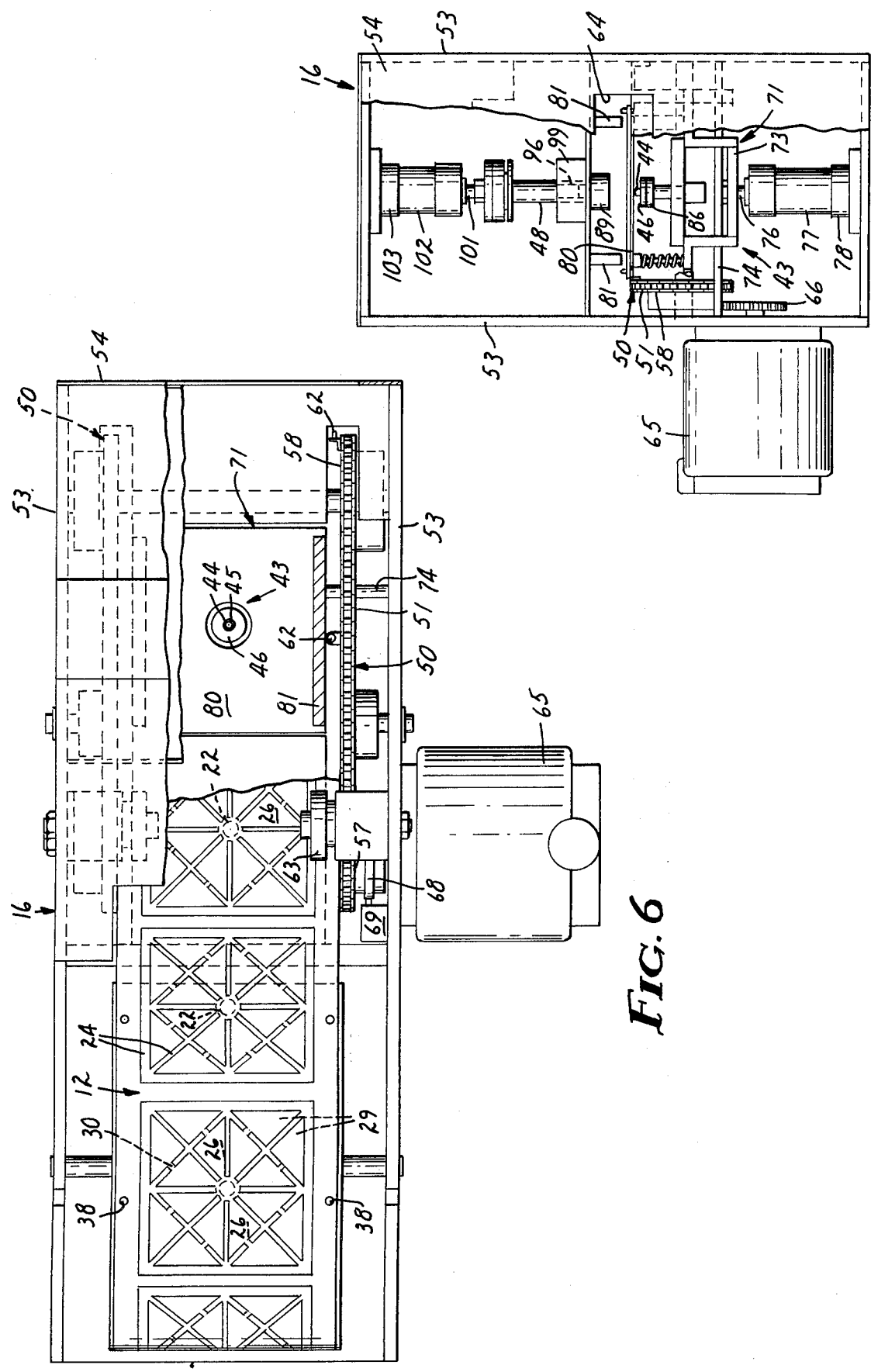
FIG. 5 is an end view, partially in section, of the device of FIG. 4.
FIG. 6 is a top view, partially in section, of the device of FIG. 4.

The strip material 12, as is best illustrated in FIG. 2, comprises first and second thin flexible films 18 and 20 each comprising a heat sealable polymeric thermoplastic material forming at least one surface, and positioned with their thermoplastic surfaces in face-to-face contact.

The first film 18 has a plurality of openings 22 which are spaced longitudinally of the strip material 12, and are generally centered across the width of the strip material 12. The films 18 and 20 are fused together under pressure and heat in discrete generally linear areas 24 to define, for each of the openings 22, a plurality of generally triangular inflatable chambers 26 between the layers 18 and 20. The chambers 26 are disposed around the opening 22 and each have a portion providing an inlet passageway 28 to the chamber 26 from the opening 22. Additional secondary triangular chambers 29 are formed around the chambers 26 to complete a desired pattern for the cushion 14. The chambers 29 each communicate with the opening 22 through one of the chambers 26 and a crossover passageway 30, which passageways 30 afford inflation of the chambers 29 and shock absorption for the inflated cushion via air transfer between the interconnected chambers 26 and 29.

The films 18 and 20 may consist of a polyolefin such as polyethylene or polypropylene, or a layered film (e.g. coated, laminated or co-extruded film) such as a polyester backed ethylene vinyl acetate copolymer, a polyvinylidene chloride coated polyethylene, a thermoplastic coated paper or a polyolefin coated polyester. The main requirement for the film is that a heat sealable material forming at least one of its surfaces will fuse to a mating surface to form an air tight seal when the films are subjected to the application of moderate pressure and heat, and that it has desired strength and gas barrier properties. A polyester film coated with an ethylene vinyl acetate copolymer has been found to produce air cushions having a very high bursting strength, which may be particularly desirable for some applications.

Figure 3:
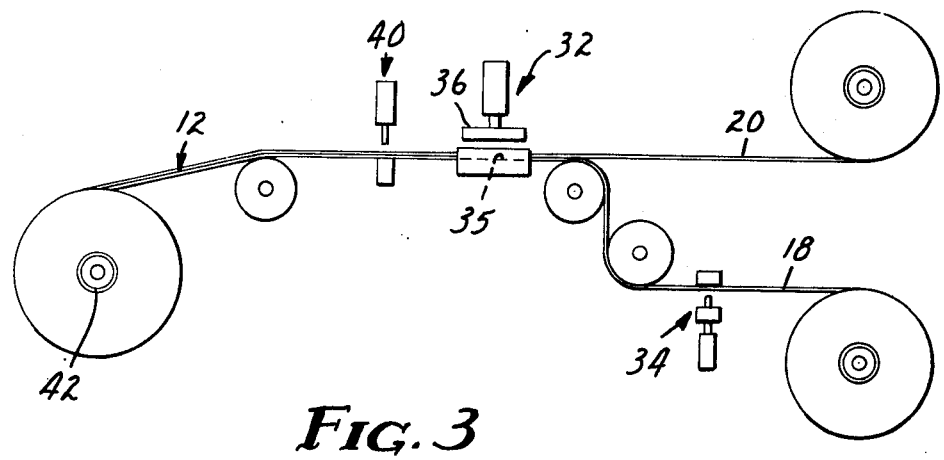
FIG. 3 is a schematic illustration of the preparation of the strip material of FIG. 2.

As is schematically illustrated in FIG. 3, the strip material 12 is conveniently prepared by feeding the first and second films 18 and 20 along separate paths to a forming station 32. The first film 18 is fed past a punch mechanism 34 which punches the openings 22 along its length. At the forming station 32 the films 18 and 20 are supported on a planar surface 35 in face-to-face contact with their edges aligned, and the face of an electrically heated die 36 having raised ridges in the configuration of the discrete areas 24 to be fused between the films 18 and 20 is pressed against the second film 20 to fuse the films 18 and 20 together. Alternatively the discrete areas 24 between the films 18 and 20 can be fused together by the known process of infra-red black line sealing using a copying machine such as the Model 47 "Thermofax" Copier sold by Minnesota Mining and Manufacturing Company, St. Paul, Minn. Subsequent to fusing of the areas 24 a punch assembly 40 punches perforations 38 along the edges of the strip material 12 in a predetermined relationship with respect to the openings 22 to provide a means for indexing the strip material 12 in the device 16, and the strip material 12 is wound on a spool 42 for shipment to the site where the inflatable cushions 14 formed therein will be inflated and sealed.

The device 16 for inflating and sealing the cushions 14 is best seen in FIGS. 4 through 9. Generally the device 16 includes means for positioning the inflatable cushion 14 at an inflation station 43 defined on the device 16, means for positioning a nozzle 44 in the opening 22 of the cushion 14 with the surface of the cushion 14 smoothly supported around the nozzle 44 and over a support surface 46 spaced a short distance from a terminal end 45 of the nozzle 44 (see FIG. 7), means for directing air through the nozzle 44 to inflate the supported cushion 14 (see FIG. 8), and means for sealing the inflated chambers 26 in the cushion 14, including the end of a heated, hollow, cylindrical tube 48 which is pressed toward the support surface 46 around the nozzle 44 to seal shut the inlet passageways 28 around the opening 22 (see FIG. 9).

The means for positioning the inflatable cushion 14 at the inflation station 43 includes a motor driven endless conveyor 50 comprising two endless chains 51. The chains 51 are movably supported on spaced walls 53 of a frame 54 for the device 16 by a first and a second pair of sprockets 57 and 58. Each pair of sprockets 57 and 58 is fixed to a common shaft rotatably mounted between the walls 53 to insure simultaneous movement of the chains 51. An adjustable idler sprocket 60 is also provided for tensioning each chain 51, so that the chains 51 will move along a generally linear path portion between the sprockets 57 and 58 and past the inflation station 43.

The chains 51 each carry a plurality of pins 62 spaced along the length of each chain 51 and positioned opposite each other between the chains 51. The pins 62 are adapted to enter the perforations 38 along the edges of the strip material 12, and thus make driving contact with the strip material 12 to drive it from the spool 42 which is rotatably supported on the frame 54, under a roller 63 which guides the strip material 12 onto the pins 62, along the linear path portion of the conveyor past the inflation station 43, and subsequently (after inflation) out of an outlet opening 64 in the frame 54.

A synchronous motor 65 supported on the frame 54 drives the conveyor 50 through a sprocket 66 coupled to the motor 65, and a sprocket 67 coupled to the shaft on which are mounted the first pair of sprockets 57. Operation of the motor 65 is controlled by a cam 68 and switch 69 assembly in which the cam 68 is fixed to the shaft for the first pair of sprockets 57, and the switch is fixed on the frames 54. The cam 68 has two equally spaced lobes, so that each half revolution of the first pair of sprockets 57 (which are sized so that one half revolution thereof will advance the conveyor a distance eqaul to the length of one inflatable cushion to change the inflatable cushion 14 at the inflation station 43) will activate the switch 69 and via a control circuit for the device 16, will deactivate the conveyor 50 until the device is again activated to inflate another cushion 14. The cam 68 is properly indexed with respect to the pins 62 and perforations 38 in the strip material 12 to position an opening 22 in the strip material 12 at the inflation station 43 over the nozzle 44 after each operation of the motor 65.

The means for positioning the nozzle 44 in the opening 22 of a cushion 14 at the inflation station 43 with the surface of the cushion 14 smoothly supported around the nozzle 44 includes a clamp and nozzle assembly 71. The clamp and nozzle assembly 71 can be moved into contact with the inflatable cushion 14 to first clamp its opposite edges in a fixed position, and then moves the terminal end 45 of the nozzle 44 into the opening 22 and the support surface 46 into engagement with the cushion 14 at the inlet passageways 28 adjacent the opening 22 to tension and smooth the uninflated cushion 14 around the nozzle 44.

The clamp and nozzle assembly 71 includes a nozzle table 73 which supports the nozzle 44 with its terminal end 45 projecting outwardly at right angles to the strip material along the conveyor 50 path portion between the sprockets 57 and 58. The nozzle table 73 is guided for movement relative to the frame 54 in a direction at a right angle to the path portion for the conveyor 50 between the sprockets 57 and 58 by a rod 74 which is slidable along slots 75 in both side walls 53. The nozzle table 73 is fixed to a piston 76 of an air cylinder 77 which has its housing 78 fixed to the frame 54. The nozzle table 73 is movable via the air cylinder 77 between positions defined by the ends of the slots 75, including a retracted position (FIGS. 4 and 5) with the nozzle 44 spaced from the strip material 12 on the conveyor 50, and an extended position with the terminal end 45 of the nozzle 44 projecting through the conveyor 50 in a position to engage the opening 22 in an inflatable cushion 14 at the inflation station 43 (FIGS. 7, 8, and 9).

The nozzle table 73 also supports a clamping plate 80 which during movement of the nozzle table 73 from its retracted to its extended position provides means for lifting the cushion 14 at the inflation station 43 from the pins 62 prior to its inflation; and for clamping two opposite edges of the inflatable cushion 14 at the inflation station 43 with sufficient force so that further movement of the nozzle table 73 will press the nozzle 44 into the opening 22 in the clamped cushion 14 and smooth and tension it about the nozzle 44, while affording limited frictional movement of the edges of the cushion as the dimensions of the cushion 14 shorten during its inflation.

The clamping plate 80 has four rods 83 projecting from its corners and mounted in axial sliding engagement through openings in the nozzle table 73. A coil spring 84 is positioned around each of the rods 83 between the nozzle table 73 and the clamping plate 80 to provide means for biasing the clamping plate 80 toward an outer position relative to the nozzle table 73, which position is defined by retaining collars 85 engaged with the ends of the rods 83. The clamping plate 80 has a central opening which will permit the nozzle 44 to project through the clamping plate 80. During movement of the nozzle table 73 toward its extended position, the clamping plate 80 will contact and press the cushion 14 on the conveyor 50 at the inflation station 43 against the clamping bars 81, securing the edges of the cushion 14 in place. Further movement of the nozzle table 73 toward its extended position will cause the nozzle table 73 to move along the rods 83 against the bias of the springs 84 (which exert increasing force to clamp the cushion 14 between the clamping plate 80 and the bars 81) and will cause the nozzle 44 to project through the clamping plate 80 where it will enter the opening 22 and subsequently raise the center of the cushion 14 to smooth and tension it around the nozzle 44.

Figure 7:
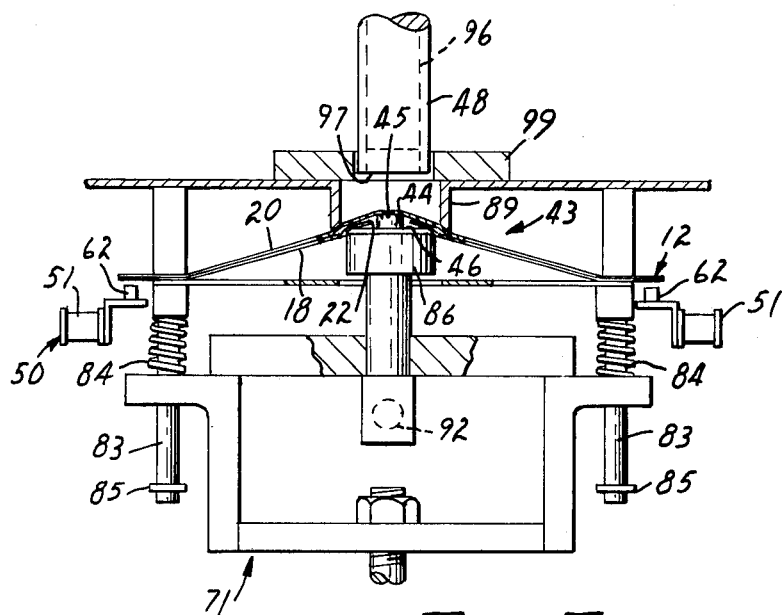
FIG. 7 is an enlarged fragmentary view, partially in section of an inflation station in the device of FIG. 4 illustrating a cushion positioned about an inflating nozzle therein.
Figure 8:
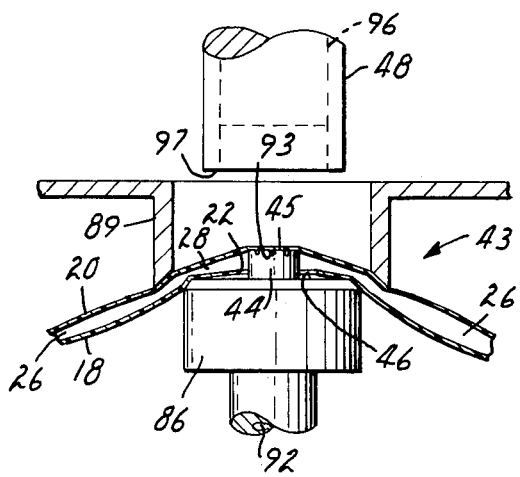
FIG. 8 is an enlarged fragmentary view, partially in section of the nozzle in FIG. 7 during the inflation of a cushion.
Figure 9:
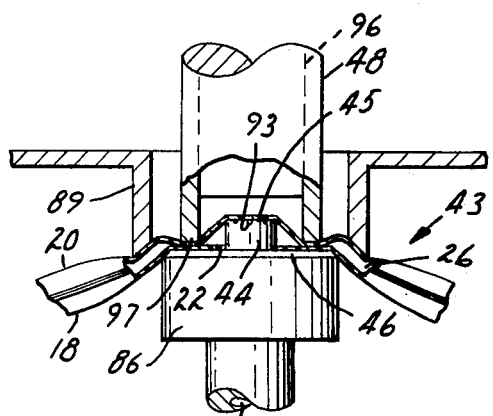
FIG. 9 is an enlarged fragmentary view, partially in section of the nozzle in FIGS. 7 and 8, but illustrated with a heated tube in position to seal an inflated cushion.

As is best seen in FIGS. 7, 8, and 9 the means for smoothing the cushion 14 about the nozzle 44 also includes a cylindrical support 86 (preferably of a resilient heat resistant material such as silicon rubber) spaced from the terminal end of the nozzle 44. The support 86 provides the annular support surface 46 which is coaxial with the nozzle 44, is spaced axially a short distance from the terminal end 45 of the nozzle 44, and has a diameter selected to provide a predetermined conical shape for the portion of the cushion 14 tensioned over the nozzle 44 and support 86. Additionally, as is best seen in FIG. 8, when the nozzel table 73 is in the extended position the nozzle 44 and support 86 enter a hollow cylindrical ring 89 fixed to the frame 54. The ring 89 has an inner diameter about one-sixteenth to one-eighth inch larger than the outer diameter of the support 86, and a smooth frusta-conical terminal end which will contact and further smooth the cushion 14 around the support 86.

The nozzle 44, which is mounted on the nozzle table 73, is hollow, and has a central axis aligned in the direction of movement of the nozzle table 73. The terminal end 45 of the nozzle 44 is open, and the nozzle 44 has an inlet opening 92 which is coupled to means for applying a regulated source of air under greater than atmospheric pressure. The nozzle 44 has a plurality of apertures 93 spaced around its periphery and formed in its terminal end 45 (see FIGS. 7 and 8). The apertures 93 are adapted to provide outward movement of air radially of the nozzle 44 when a cushion 14 is tensioned over the terminal end 45 thereof. As is best seen in FIG. 8, with the terminal end 45 of the nozzle positioned in the opening 22 of a cushion 14 tensioned over the nozzle 44, the air will exit through the apertures 93 along the portion of the second flexible layer 20 which extends across the opening 22, and enter the inlet passageways 28 to inflate the chambers 26. The ring 89 and support 86 for smoothing the cushion 14 insure that the inlet passageways 28 will be positioned to receive the air and insure even inflation of all the chambers 26 and 29.

It has been found that the cushion 14 can also be inflated by the nozzle 44 when its terminal end 45 is spaced a short distance from the portion of the film 20 that extends across the opening 22. The portion of the film 20 that extends across the opening 22 apparently deflects the stream of air from the open terminal end 45 evenly into all the adjacent inlet passageways 28 for the chambers 29. The spaced nozzle 44 does not provide the degree of smoothing for the cushion 14 around the opening 22 which is provided when the end 45 of the nozzle 44 is pressed against the film 20 over the opening 22, however thus does not fill as reliably or afford as reliable a heat seal by the heated tube 48.

The means for sealing the inlet passageways 28 to the chambers 26 after the cushion 14 is inflated comprises the hollow cylindrical heated tube 48 which is heated by an internal thermostatically controlled electric heater 96 (e.g. controlled at a temperature at or above the heat sealing temperature of the films 18 and 20), and has an annular end sealing surface 97 adapted to contact and seal the cushion 14 (see FIG. 9). The end of the heated tube 48 opposite the sealing surface 97 is slidably mounted in a central opening in a cylindrical guide 99 on the frame 54 to guide the heated tube 48 for axial movement, and is fixed to a piston rod 101 of a cylinder 102 which has its housing 103 attached to the frame 54. The cylinder 102 can be activated to move the heated tube 48 between a waiting position spaced from an inflatable cushion 14 tensioned over the nozzle 44 with the nozzle table 73 in its extended position (see FIG. 8); and a sealing position at which the sealing end surface 97 of the heated tube 48 will be pressed against such a cushion 14 on the support surface 46 to seal shut the inlet passageways 28 of the cushion 14 in a narrow band around its central opening 22 (see FIG. 9).

A control system (not shown) will cycle the device 16 to sequentially inflate and seal cushions 14 along the strip material 12. Assuming a cushion 14 to be inflated is positioned on the conveyor 50 at the inflation station 43, the control system first activates the air cylinder 77, to move the nozzle table 73 from its retracted position (FIGS. 4 and 5) toward its extended position. This causes the clamping plate 80 to clamp the ends of the cushion 14 against the clamping bars 81, after which movement of the clamping plate 80 stops while the nozzle table 73 moves relative thereto to position the terminal end 45 of the nozzle 44 in the opening 22 in the cushion 14, and tensions the cushion 14 around the nozzle 44 with the support 86 within the ring 89 to smooth the cushion around the nozzle 44 (see FIG. 7). The control system then maintains the nozzle table 73 in its extended position, while a source of air under greater than atmospheric pressure is connected to the inlet opening 92 of the nozzle so that air passes through the nozzle 44, radially out the apertures 93, enters the inlet passageways 28 and inflates the chambers 26 and 29 in the cushion 14 (see FIG. 8). Preferably the inflation is done in two states, with air under a higher pressure initially applied (e.g. 60 psi) to insure inflation of all the chambers 26 and 29 after which air under a lesser pressure (e.g. 15 psi) is applied to regulate the amount of pressure subsequently sealed in the chambers 26 and 29. This lesser pressure can be varied as desired to vary the resiliency of the inflated cushion 14.

After inflation, and while the air pressure is still being applied, the control circuit activates the cylinder 102 to move the tube 48 to its sealing position for a short predetermined time to press the sealing surface 97 of the heated tube 48 against the inlet passageways 28 over the support 86 thereby sealing shut the passages 28 (see FIG. 9). The continued application of air during the sealing process provides a desirable cooling effect for the sealed area of the cushion after the heated tube returns to its waiting position which restricts rupture of the seal area under the pressure of air in the chambers 26.

At the end of said predetermined time the control circuit returns the heated tube 48 to its waiting position and the nozzle table 73 to its retracted position, and activates the motor 65 to run the conveyor 50 which via engagement between the pins 62 and the next cushion 14 to be inflated pushes the inflated cushion 14 from the outlet opening 64 in the frame 54 and positions said next cushion 14 at the inflation station 43 (which position is determined when the cam 68 actuates the switch 69 to deactivate the motor). The cycle then repeats to inflate and seal the new cushion 14 at the inflation station 43.

Figure 10:
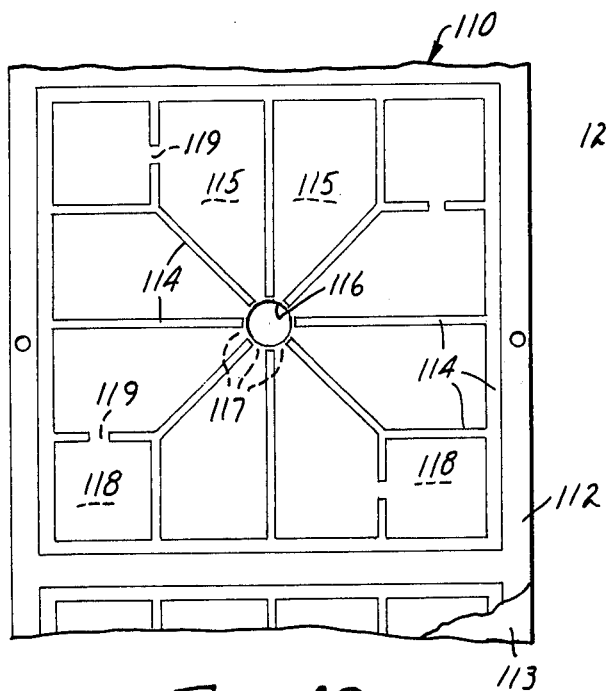
FIGS. 10, 11, and 12 illustrate alternate embodiments for the strip material of FIG. 2.
Figure 11:
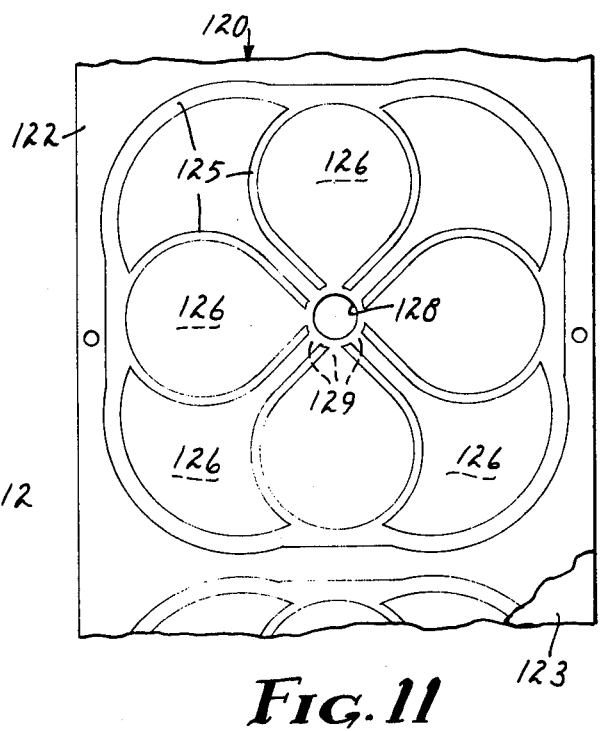
Figure 12:
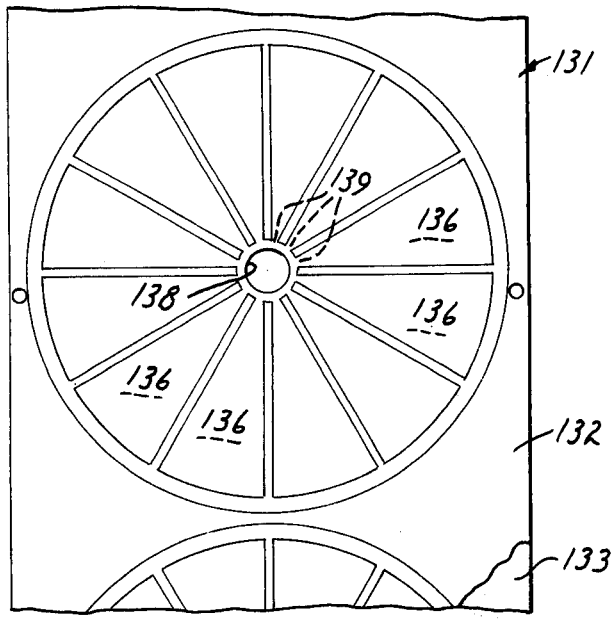

FIGS. 10, 11, and 12 illustrate alternate embodiments of inflatable cushions of the type illustrated in FIG. 2, which cushions may be prepared by the general process shown in FIG. 3 through the use of a different die and which can be inflated and sealed on the device 16.

FIG. 10 shows an inflatable cushion 110 having two thin flexible films 112 and 113 each comprising a heat sealable thermoplastic material, forming one surface. The thermoplastic surfaces of the films 112 and 113 are positioned in face-to-face contact and fused together in discrete generally linear areas 114 to define between the films 112 and 113 a plurality of inflatable chambers 115 disposed around a central opening 116 in the film 112, each having a portion providing an inlet passageway 117 to the chamber 115 from the opening 116. Additional secondary rectangular chambers 118 are formed in the corners of the inflatable cushion 110, and communicate with the opening 116 through crossover passageways 119 and the adjacent chamber 115.

FIG. 11 shows an inflatable cushion 120 having two films 122 and 123 each comprising a heat sealable thermoplastic material forming at least one surface. The thermoplastic surfaces of the films 122 and 123 are in face-to-face contact and fused together in discrete generally arcuate areas 125 to define a plurality of generally petal shaped inflatable chambers 126 between the films 122 and 123. The chambers 126 are disposed around a central opening 128 in the film 122, with each chamber 126 having a portion providing an inlet passageway 129 to the chamber 126 from the opening 128.

FIG. 12 shows an inflatable cushion 131 having two thin flexible films 132 and 133 each comprising heat sealable thermoplastic material forming at least one surface. The thermoplastic surfaces of the films 132 and 133 are positioned in face-to-face contact and fused together in discrete linear and arcuate areas 135 to define a plurality of generally pie shaped inflatable chambers 136 between the films 132 and 133. The chambers 136 are disposed around a central opening 138 in the film 132, with each chamber 136 having a portion providing an inlet passageway 139 to the chamber 136 from the opening 138.

Figure 13:
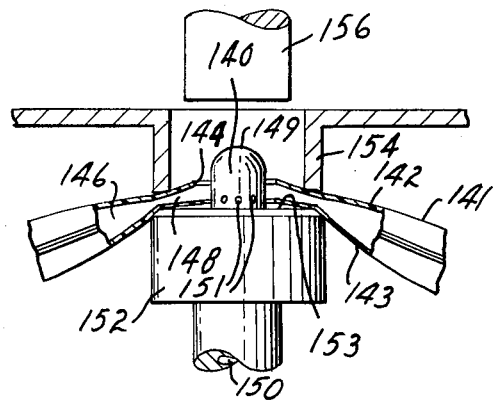
FIG. 13 illustrates an alternate embodiment of the nozzle of FIGS. 7, 8, and 9.

FIG. 13 illustrates an alternative embodiment for a nozzle 140 which with a small modification of the strip material, can also be used in the device 16 to inflate cushions.

Except for its central opening 144 a cushion 141 to be inflated with the nozzle 140 is generally of the same structure as the cushions 14, 110, 120, or 131 for use with the nozzle 44. The cushion 141 comprises two thin flexible films 142 and 143 each comprising a heat sealable thermoplastic material forming at least one surface, and positioned with the thermoplastic surfaces of the films 142 and 143 in face-to-face contact. The films 142 and 143 are fused together under pressure and heat in discrete areas to define a plurality of inflatable chambers 146 between the films 142 and 143; with the chambers 146 being disposed around the central opening 144 in the film 142, and each having a portion providing an inlet passageway 148 to the chamber 146 from the opening 144. Unlike the cushions 14, 110, 120, or 131, however, the central opening 144 of the cushion 141 passes through both of the films 142 and 143.

The nozzle 140 is hollow, has a projecting closed terminal end 149, and an inlet opening 150 which is coupled to means for providing a source of air under greater than atmospheric pressure. The nozzle 140 has a plurality of apertures 151 spaced around its periphery which are adapted to provide outward movement of air radially of the nozzle 140. As is seen in FIG. 13, with the terminal end 149 of the nozzle 140 positioned in and projecting through the opening 144 of a cushion 141 smoothed around the nozzle 140, air from the nozzle 140 will exit through the apertures 151 and enter the inlet passageways 148 to inflate the chambers 146. A circular support 152 is positioned about the nozzle 140 and provides a support surface 153 spaced axially from the terminal end 149 of the nozzle 140 which, with a smoothing ring 154 spaced from the support surface 153 will smooth the cushion 141 around the nozle 140. The support surface 153 also supports the inlet passageways 148 while they are receiving air from the nozzle 140, to insure even inflation of the chambers 146, and will provide a mating pressure surface for a heated sealing tube 156 which is similar in design and function to the tube 48.

We claim:

1. A concatenation of uninflated cushions, comprising two elongate, flexible films, each film comprising a heat sealable thermoplastic material forming at least one surface of the film, at least one of said films having a plurality of longitudinally spaced openings, said films being longitudinally aligned and positioned with their thermoplastic surfaces adjacent and with all adjacent portions of their thermoplastic surfaces in face-to-face contact, said films being fused together in discrete areas to define a plurality of cushions, each of said cushions including a continuously fused area extending entirely around each of said openings and fused areas within said continuous fused area defining a plurality of unsealed adjacent surface areas in a pattern providing inflatable primary chambers between the films and disposed around the opening, inflatable inlet passageways communicating between the opening and the primary chambers around the opening, secondary inflatable chambers adjacent said primary chambers, and a crossover passageway for each of said secondary inflatable chambers communicating between the secondary chamber and one of said primary chambers with the opening providing the only inlet to the chambers and passageways so that air directed through the opening into the inlet passageways will simultaneously inflate the primary chambers and via the crossover passageways the secondary chambers, which inflated chambers can then be sealed by heat sealing the inlet passageways in a band around that opening.

* * * * *